United States Patent [19]
Zeigerson et al.

[11] 3,962,208
[45] June 8, 1976

[54] NOVEL FLAME RETARDANTS AND THEIR PRODUCTION BY CHLOROBROMINATION OF WOOD PULP WASTE LIQUORS

[75] Inventors: Esther Zeigerson, Omer; Moshe Rudolf Bloch, Beer-Sheba, both of Israel

[73] Assignee: The State of Israel, Ministry of Commerce & Industry, Jerusalem, Israel

[22] Filed: Feb. 10, 1975

[21] Appl. No.: 548,797

[52] U.S. Cl. ............................. 260/124 R; 252/8.1
[51] Int. Cl.² ........................................ C07G 1/00
[58] Field of Search ................. 260/124.3, 124; 252/8.1

[56] References Cited
UNITED STATES PATENTS

| | | | |
|---|---|---|---|
| 3,438,959 | 4/1969 | Kina | 260/124.3 |
| 3,862,854 | 1/1975 | Zeigerson et al. | 260/124 |

*Primary Examiner*—Lewis Gotts
*Assistant Examiner*—D. R. Phillips
*Attorney, Agent, or Firm*—Millen, Raptes & White

[57] ABSTRACT

Novel chloro-brominated sulfurated lignin products obtained by chlorobromination of wood pulp waste liquors, having a total halogen content of from about 18 to about 40% by weight and a w:w Br:Cl ratio of from about 1:1 to about 5:1. The novel substances are used for flame proofing inflammable materials.

18 Claims, No Drawings

NOVEL FLAME RETARDANTS AND THEIR PRODUCTION BY CHLOROBROMINATION OF WOOD PULP WASTE LIQUORS

The present invention concerns a process for producing flame retardants from black liquors of the paper industry, and novel products obtained thereby.

In the paper industry pulps are produced by the decomposition of wood by either the sulfite or sulfate process. In either case after the separation of the pulp there is left a waste liquor which in the case of the sulfite process contains lignin sulfonate and in the case of the sulfate process contains sulfurated alkali lignin also known as kraft lignin. From the so-called black liquors kraft lignins and lignin sulfonate are recovered commercially in the forms of solid dry products by various companies and made available for various purposes. For example, the Crown Zellerbach Company produces a lignin sulfonate under the trade name ORZAN AH-3, The Westvaco Company produces a kraft lignin under the trade name INDULIN AT, the American Can Company produces a lignin sulfonate under the trade name MARASPERSE C-21, and there are many others.

In the specification of our Israel patent application Ser. No. 37812 of the Sept. 28, 1971, and the corresponding U.S. application Ser. No. 290581 of the Sept. 20, 1972, now U.S. Pat. No. 3,862,854 as well as in the specifications of corresponding patent applications in other countries we have disclosed that by the bromination of kraft lignin or lignin sulfonate it is possible to obtain flame retardants suitable for flame proofing of inflammable materials. Thus, for example, it is possible to produce particle boards with a high degree of fire resistance by incorporating in the bonding composition, e.g. urea-formaldehyde prepolymerisate, a certain amount of brominated lignin sulfonate (B.L.S.) or brominated kraft lignin (B.L.).

Known processes for the production of B.L.S. or B.L. are quite cumbersome, requiring several operational stages. In these processes it is first necessary to produce dry lignin sulfonate or dry kraft lignin serving as starting material, from the so-called black liquors by multistage concentration and precipitation procedures. This starting material is then slurried in water or an electrolyte solution, the slurry is subjected to chemical or electrolytical bromination, and after the bromination the product B.L.S. or B.L., as the case may be, is recovered from the slurry.

This multi-stage procedure increases the price of the finished product to the extent that it stands in the way of the commercial applicability of B.L.S. and B.L. It is therefore the object of the present invention to provide a simplified comprehensive process for the production of B.L.S. and B.L. directly from black liquors.

Experiments conducted preparatory to the present invention to brominate black liquors directly failed inasmuch as the bromine efficiency was too low for commercial purposes. Thus, in one of the experiments 31 g of bromine was added to 60 g of black liquor obtained from the Hudson Pulp and Paper Company, U.S.A., while stirring constantly. Brominated kraft lignin settled from the solution and after rinsing with water and drying at 70°C, 18.7 g of a product was obtained which analysed as follows:

| | |
|---|---|
| Br | 26.3% |
| Br$^-$ | 1.0% |
| pH | 3.6 |

The comparatively low bromine content correspond to a bromine efficiency of only 32%.

Similar experiments were conducted with other black kraft lignin liquors such as obtained from Stora Kopparberg, Skutskar, Sweden; Eckmann & Co., Goteborg, Sweden, and Fincell, Finland, as well as with black lignin sulfonate liquors obtained from the same sources.

In accordance with the invention it has surprisingly been found that the bromine efficiency in the bromination of black lignin sulfonate or kraft lignin liquors can be appreciably increased to within the range of from 50–75% and even higher by a basically two-stage process comprising the steps of chlorination, and chlorobromination.

Hereinafter the brine obtained from the decomposition of wood by either the sulfite or sulfate process and containing, respectively, sulfonated lignin and kraft lignin, will be referred to collectively for short as sulfurated lignin liquors. Where the sulfurated lignin liquor serving as starting material contains lignin sulfonate, the brominated product will be referred to as brominated lignin sulfonate and B.L.S. for short, and where the sulfurated lignin liquor serving as starting material contains kraft lignin, the brominated product will be referred to as brominated lignin and B.L. for short.

In accordance with the invention a solid chlorobrominated product is prepared from a sulfurated lignin liquor by a process which comprises introducing elemental chlorine into the liquor, then chlorobrominating the liquor and separating a solid product.

Preferably, the amount of chlorine introduced into the sulfurated lignin liquor does not exceed about 15% of the total experimentally determined halogen requirement.

The chlorobromination may be effected by means of chlorine and a bromide salt or by chlorine and bromine which may be added concurrently or in a two-step operation co-currently or countercurrently, in the first of which steps the liquor is brominated with elemental bromine and in the second it is chlorinated. Where a mixture of chlorine and bromine is used for the chlorobromination, the bromide is oxidized in situ by the chlorine into elemental bromine which reacts with the sulfurated lignin. Where elemental bromine is used for this reaction the chlorine reoxidizes the bromine formed as a by-product so that only half the theoretically required amount of bromine is needed whereby the bromine efficiency of the process is increased.

It has been found that due to the preliminary chlorination in the process according to the invention, the bromine efficiency of the process is substantially increased as compared to the direct bromination of a sulfurated liquor, and this may presumably be ascribed to the consumption of chlorine by various reducing agents present in the liquor, which consumption does not contribute to the desired final product. If the liquor is directly brominated without preliminary chlorination, the same reducing agents consume a substantial part of the bromine and thereby substantially reduce the bromine efficiency of the process. Since chlorine is considerably cheaper than bromine it is clearly more profitable if chlorine rather than bromine is consumed by an undesired side reaction.

It has further surprisingly been found in accordance with the invention that the total halogen content of the product (Br + Cl) is larger than in the case of pure bromination. In other words, the chlorine content of the product is larger than corresponds to a mere replacement of some of the bromine and it has surprisingly been found that by this the fire resisting properties of the product are not inferior and in some cases even superior to those of a corresponding product which is only brominated. In other words, according to the invention by a combined chlorobromination a flame retarding effect is achieved which is at least the same as by pure bromination in an equivalent amount in accordance with known methods. This constitutes an obvious economic advantage in view of the fact that chlorine is cheaper than bromine.

Preferably, the sulfurated liquor is acidified prior to the first chlorination. For this purpose it is, for example, possible to use hydrochloric or hydrobromic acid or the mother liquor from a previous batch which is acidic due to the in-situ formation of HCl and some HBr.

Where the sulfurated liquor serving as starting material contains kraft lignin the optimal concentration of solids is 30–45% by weight. The solution is preferably heated prior to the reaction, e.g. to about 70°C, in order to expel $H_2S$.

Where the sulfurated liquor serving as starting material contains lignin sulfonate the optimal concentration of solids is 45–60% by weight. In this case it is preferable to add some electrolytes to the liquid such as $K_2SO_4$, NaCl or others.

In a preferred embodiment of the invention chlorination is continued for a while after completion of the chlorobromination and precipitation of B.L.S. or B.L., as the case may be, whereby the product is brightened.

After completion of the reaction the product B.L.S. or B.L., as the case may be, is filtered off, washed and dried. If desired, acid components of the wet or dry products may be neutralized by treatment with ammonia or by the addition of solid basic substances such as a carbonaceous phosphate rock, an antimony oxide, borax, an alkali metal hydroxide, an alkali earth metal hydroxide or any other suitable base or alkali salt.

The chlorobrominated products obtained in accordance with the invention are novel substances. Their total halogen content is from about 18% to about 40% by weight, preferably from about 30 to about 35% by weight, and the w:w Br:Cl ratio is from about 1:1 to about 5:1, the preferred range being from about 2:1 to about 3:1.

The invention thus provides novel substances being chloro-brominated sulfurated lignin products obtained by chlorobromination of sulfurated lignin liquors, which substances have a total halogen content of from about 18% to about 40% by weight and a w:w Br:Cl ratio of from about 1:1 to about 5:1, and preferably from about 2:1 to about 3:1.

More specifically, the novel substances according to the invention are characterized in that they are obtained by the chlorobromination of a liquor resulting from the decomposition of wood by either the sulfate or sulfite method and the removal of the pulp, which chlorobromination comprises introducing elemental chlorine into the liquor then chlorobrominating the liquor and separating a solid product, and they are further characterized by the following:

a. a total halogen content of from about 18% to about 40% by weight;
b. a w:w Br:Cl ratio of from about 1:1 to about 5:1 and preferably from about 2:1 to about 3:1.

The novel substances according to the invention are useful as flame retardants. Consequently, a further aspect of the invention concerns a method of flame proofing inflammable material comprising incorporating in such material a novel chloro-brominated substance according to the invention. The incorporation may be effected by impregnating, soaking or coating the inflammable material with a liquid dispersion of the novel chloro-brominated substance.

In one embodiment of the invention the said chloro-brominated substance is incorporated in a binder employed for the production of composite bodies of inflammable material, thereby imparting to said bodies a desired degree of flame resistance.

The invention is illustrated by the following Examples and Experiments to which it is not limited. In all the Examples and Experiments, all percentages indicating composition are by weight.

EXAMPLE 1

30 g Of a black kraft lignin liquor obtained from the Hudson Pulp and Paper Company, U.S.A., was diluted with 30 ml of water and the slurry was heated to about 70°C while stirring for about half an hour during which time $H_2S$ gas evolved. Thereafter through a calibrated rotameter an amount of 2 g of chlorine was bubbled in over 8 minutes and this was followed by the addition of 3.1 g of liquid bromine over a period of 10 minutes concurrently with a further amount of 7.5 g of chlorine which was bubbled into the solution during 30 minutes. A solid product precipitated which was filtered off and washed with water. The B.L. product amounted to 8.9 g and contained 23.3% Br and 7.4% of Cl. The bromine efficiency was 67%.

It should be noted that the bromine efficiency depends on the escape of surplus chlorine which always entrains some of the bromine with it. This entrained bromine can be recovered together with the chlorine by a countercurrent gas absorption arrangement. Since practically no bromine ions were found in the filtrate it follows that in production the bromine efficiency may, in accordance with the invention, be increased by recovery of entrained bromine from the escaping gases.

EXAMPLE 2

The procedure was similar as in Example 1 but the elemental bromine was replaced by 4.6 g of KBr corresponding to 3.1 g of bromide ion. The amount of chlorine required for the chlorination was 10.5 g which was fed to the reaction mixture over a period of 42 minutes. The B.L. product amounted to 8.8 g containing 23.2% Br and 8.4% Cl. The bromine efficiency was 66%.

EXAMPLE 3

45 ml Of the acidic mother liquor remaining from the process according to Example 1 were added to 30 g of a black liquor obtained from the Hudson Pulp and Paper Company, U.S.A., 2 g of chlorine gas was bubbled in and thereafter 4.5 g of potassium bromide corresponding to 3.1 g of bromide ion was added and 10.5 g more of chlorine was bubbled into the solution. There formed a precipitate which was filtered off, washed and dried. In this way 9.6 g of a B.L. product containing 22.6% Br and 11.4% Cl were obtained. The bromine efficiency was 70%.

EXAMPLE 4

25 ml Of an acidic mother liquor from the process according to Example 1 and 10 ml of water were added to 60 g of Hudson black liquor. The slurry was heated to 70°C for a period of about 15 minutes until $H_2S$ evolution ceased. Thereafter an additional amount of 15 ml of water was added following which 4.5 g of chlorine was bubbled in the solution. 9.2 g of potassium bromide corresponding to 6.2 g of bromide ion was added and 17.3 g of chlorine was bubbled into the solution over a period of 23 minutes. After the normal working up there was obtained 19.4 g of a B.L. product containing 24.1% of Br and 9.1% of Cl. The bromine efficiency was 75.4%.

EXAMPLE 5

To a solution of 60 g of black sulfite liquor obtained from the Stora Kopparberg Co., Sweden, there was added 60 ml of a 1N $K_2SO_4$ solution. After mixing for about 5 minutes 4.5 g of chlorine was bubbled in. Thereafter 20 ml of a 3.8 N KBr solution corresponding to 6.2 g of bromide ion was added and another 15 g of chlorine was bubbled into the solution. The reaction was exothermic and in the course thereof B.L.S. precipitated. The product was filtered off, rinsed with 1N $K_2SO_4$ and dried at 70°C to constant weight.

In this way there was obtained 26.6 g of B.L.S. product containing 10.9% of Br and 7.6% of Cl. Efficiency was 46.8%.

EXAMPLE 6

The procedure of Example 5 was repeated using, however, 2 ml of liquid bromine instead of a bromide solution. 20.7 g of a dry B.L.S. product containing 14.6% of Br and 8.6% of Cl was obtained. The bromine efficiency was 48.8%.

EXAMPLE 7

A mixture of 30 ml of sulfite black liquor obtained from the Stora Kopparberg Co., Sweden, with 30 ml of sulfate black liquor from the same source was prepared. 30 ml of 1N $K_2SO_4$ and 30 ml of an acidic mother liquor from a kraft lignin chlorobromination process was added. The materials were mixed for half an hour at 70°C until $H_2S$ evolution ceased. Thereafter chlorobromination was effected as in Example 5. There was obtained 21.7 g of a product being a mixture of B.L. and B.L.S. It contained 14.2% Br and 7% Cl and the bromine efficiency was 49.7%.

In all the foregoing Examples a sharp change of the colour of the slurry from dark brown to yellow was observed when the chlorobromination reaction was finished. Filtration and washing properties of the product were very good.

There now follows a short description, by way of example only, as to how the B.L.S. and B.L. produced in accordance with the invention can be used as flame retardants.

Experiment 1

10 g. Of B.L. obtained by chlorobromination of Hudson black liquor in accordance with Example 4 were dissolved in about 150 ml of ethyl alcohol. Standard size (2 × 8.5 inch) pieces of paper board were dipped in the solution and afterwards dried at 70°C to constant weight. Analysis revealed the presence of 4.1% by weight of Br in the paper board. Fire resistance tests of the samples were conducted in accordance with ASTM 777–45 as follows:

An impregnated specimen having the above size was held in a metal frame and exposed, with the long axis in a vertical position, to a standard test flame. The test flame was applied for 12 seconds and then withdrawn. The duration of continued flaming and of the after glow was recorded. Average char length allowed is 11.93 cm (4.5 inches) and the maximum should be no more than 14.4 cm (5.5 inches).

The results achieved with the samples impregnated as above are summed up in the following Table 1.

Table 1

| | Impregnation of paperboard by dipping in alcoholic solutions | | |
|---|---|---|---|
| Sample | Time of burning with flame (seconds) | Time of afterglow (seconds) | Char length (cm) |
| Blank | 75 | 180–240 | Burned completely |
| 1 | 0 | 0 | 0 |
| 2 | 0.5 | 30 | 0.7 |

The color of the impregnated paperboard was brown to dark brown.

EXPERIMENT 2

In this experiment B.L. prepared in accordance with the teachings of this invention, was incorporated in a binder. The binder was a starch glue obtained from the Cargal Co., Ltd., of Lod, Israel. The glue contained about 20% solids and was dark brown in color. It was mixed with different amounts of B.L. and water to obtain suitable compositions. The mixture was smeared in several homogeneous layers a few times on the paperboard. Each sample was dried at 70°C to constant weight. Some of the samples were burned under standard conditions according to ASTM 777–45 and the results are summed up in the following Table 2 where two sets of results (a) and (b) are given for each composition.

Table 2

| | Paperboard impregnation against fire by external coating | | | | |
|---|---|---|---|---|---|
| Composition of coating mixture (%) | Weight increase (%) | Burning with flame seconds | After- glow seconds | Char length (cm) | Bromin content (%) |
| Blank | | 19 | 200–300 | Burned completely | |
| 10% B.L. 60% Cargal glue 30% Additional water | a)68.4 b)61.7 | 0 | 11 19 | 6.2 8.1 | 4.33 4.25 |
| 14% B.L.S. 57% Cargal glue 29% Additional | a)69.5 | 0 | 0 | 0.4 | 4.82 |

Table 2-continued

| Composition of coating mixture (%) | Paperboard impregnation against fire by external coating | | | | |
|---|---|---|---|---|---|
| | Weight increase (%) | Burning with flame seconds | After-glow seconds | Char length (cm) | Bromin content (%) |
| water | b)69.5 | 0 | 13 | 1.8 | — |

Experiment 3

The following composition was prepared:
60% B.L. obtained in accordance with the invention
4.5% Cellulose acetate
35.5% Acetone The mixture was dried, ground and then added in an amount of 1.7% to a kraft paper slurry. After filtration, drying and the normal processing, paper pieces containing 6.5% of Br were obtained. The burning experiments of a kraft paper produced in this way gave positive results.

EXPERIMENT 4

B.L. of the same kind used in Experiment 2 above was used. The following composition is prepared:
70% wood chips
15% urea-formaldehyde prepolymerisate
15% B.L.

Small chunks of pressed particle board were produced from this mixture in a press at 10,000 p.s.i. with external heating to about 80°C by a fan. The fire resistance properties of these chunks were tested by the method outlined in Experiment 1, with the following results:

| | |
|---|---|
| Time of burning with flame, in seconds | 0 |
| Time of afterglow, in seconds | 5 |

EXPERIMENT 5

Experiment 4 was repeated with a B.L. processed in accordance with Example 4 above, with the following results:

| | |
|---|---|
| Time of burning with flame, in seconds | 0 |
| Time of afterglow, in seconds | 6 |

We claim:

1. In a process for the production of a brominated lignin, the improvement which comprises chlorinating a kraft lignin liquor, a lignin sulfonate liquor, or a mixture thereof, with chlorine prior to brominating the lignin, and then both brominating and chlorinating the lignin in the chlorinated liquor in such proportion to produce a halogenated lignin having a total halogen content of from about 18% to about 40% by weight, in a Br:Cl weight ratio of from about 1:1 to about 5:1, and thereafter separating the chloro-brominated lignin which precipitates from the liquor.

2. Process according to claim 1, wherein the amount of chlorine introduced into the liquor prior to the chlorobromination is up to about 15% of the total halogen required to completely halogenate the lignin.

3. Process according to claim 1, wherein the starting lignin is kraft lignin.

4. Process according to claim 1, wherein the starting lignin is lignin sulfonate.

5. Process according to claim 1, wherein the starting lignin is a mixture of kraft lignin and lignin sulfonate.

6. Process according to claim 1, wherein the bromination is effected with chlorine and a bromide salt.

7. Process according to claim 1, wherein the bromination is effected with bromine.

8. Process according to claim 7, wherein the chlorine and bromine are added to the liquor concurrently.

9. Process according to claim 7, wherein in the chlorobromination first the bromine is added and then the chlorine is added to the liquor.

10. Process according to claim 3, wherein the starting liquor contains 30–45% by weight of kraft lignin.

11. Process according to claim 4, wherein the starting liquor contains 45–60% by weight of lignin sulfonate.

12. Process according to claim 1, wherein the starting liquor is heated prior to chlorination to expel $H_2S$.

13. Process according to claim 1, wherein at least one electrolyte is added to the liquor prior to chlorination.

14. Process according to claim 1, wherein the starting liquor is acidified prior to chlorination.

15. Process according to claim 14, wherein the acidic aqueous phase from a previous run is used to acidify the starting liquor.

16. Process according to claim 1, wherein the precipitated product is neutralized with base.

17. Process according to claim 16, wherein the product is neutralized with ammonia.

18. Process according to claim 16, wherein the base is a solid.

* * * * *